United States Patent [19]
Kubota

[11] Patent Number: 4,577,941
[45] Date of Patent: Mar. 25, 1986

[54] OPTICAL APPARATUS
[75] Inventor: Shigeo Kubota, Tokyo, Japan
[73] Assignee: Sony Corporation, Tokyo, Japan
[21] Appl. No.: 770,000
[22] Filed: Aug. 26, 1985

Related U.S. Application Data
[63] Continuation of Ser. No. 459,932, Jan. 21, 1983.

[30] Foreign Application Priority Data
Feb. 19, 1982 [JP]  Japan .................................. 57-25522
Aug. 6, 1982 [JP]  Japan ................................. 57-136986

[51] Int. Cl.[4] .............................................. G02B 5/00
[52] U.S. Cl. ................................. 350/582; 250/493.1; 350/319
[58] Field of Search ............... 350/433, 447, 319, 582; 250/493.1

[56] References Cited
U.S. PATENT DOCUMENTS
3,717,823  2/1973  Abdale et al. ........................ 350/319
4,318,594  3/1982  Hanada ................................ 350/433

FOREIGN PATENT DOCUMENTS
2359104  6/1975  Fed. Rep. of Germany .

OTHER PUBLICATIONS
Smith, W. J. "Modern Optical Engineering", McGraw-Hill 1966, pp. 83, 84 and 94-95.

Primary Examiner—Bruce Y. Arnold
Attorney, Agent, or Firm—Lewis H. Eslinger; Alvin Sinderbrand

[57] ABSTRACT

An optical apparatus is provided which comprises: a semiconductor laser having first and second emitting points for light emitted in the junction plane and perpendicular thereto, respectively; a cap element covering the semiconductor laser and having an aperture therein; means to produce focused light; and at least one plane-parallel, light transmitting body arranged in the aperture of the cap element to cause the astigmatism of the optical apparatus to be substantially zero.

1 Claim, 8 Drawing Figures

FIG. IA
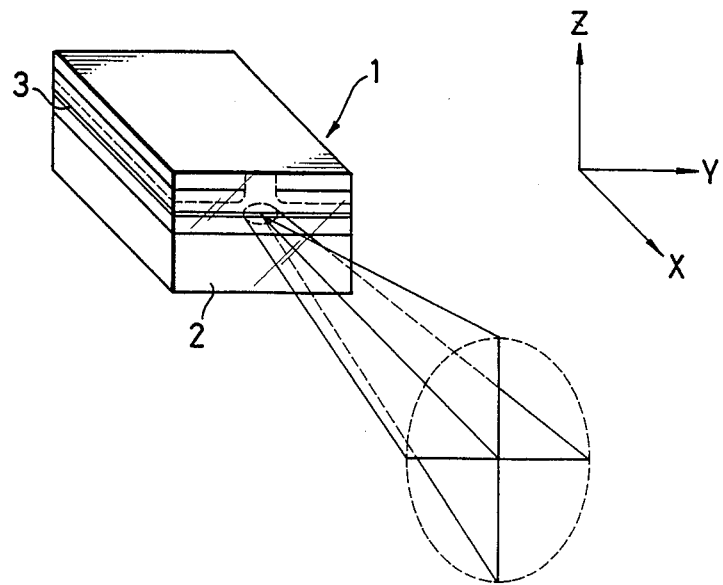
FIG. IB
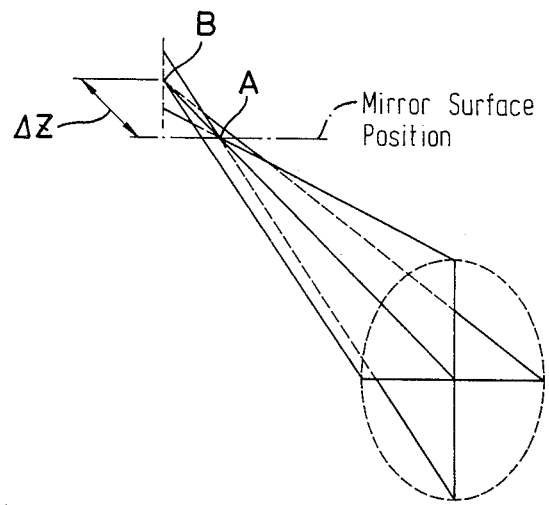

OPTICAL APPARATUS

This is a continuation of application Ser. No. 06/459,932, filed 1-21-83.

BACKGROUND OF THE INVENTION

1. Field of the Invention

The present invention relates to an optical apparatus which uses as a light source a semiconductor laser which has different focal points in a junction plane and in a plane perpendicular thereto to cause an astigmatism and, more particularly, to an optical reader suitably adapted for an audio or video disc player, which focuses light rays from a semiconductor laser onto a reading surface of an optical disc so as to read signals recorded on the reading surface.

2. Description of the Prior Art

A semiconductor laser of the gain guiding type as one type of double heterojunction semiconductor laser is free from an increase in noise level which is frequently encountered in a semiconductor laser of the index guiding type. Such an increase in noise level is caused by a self-coupling effect which is, in turn, caused by the light reflected from the reading surface of the optical disc. For this reason, a semiconductor laser of the gain guiding type is considered as a promising light source for an optical reader of a video disc player which requires a high S/N ratio. A semiconductor laser of the gain guiding type oscillates vertically in multimode oscillation, while a semiconductor of the index guiding type oscillates vertically in a single mode. Accordingly, the semiconductor laser of the gain guiding type is less subject to interference from reflected light. However, from the viewpoint of optical characteristics, as shown in FIGS. 1(A) and 1(B), oscillated light rays from a semiconductor 1 of the gain guiding type have different mode waists in the junction plane (X-Y axis plane) and in a plane perpendicular thereto (X-Z axis plane). More specifically, in the vertical plane (X-Z axis plane), the mode waist is at point A (mirror surface position) which lies in the plane of a mirror surface 2. However, in the junction plane (X-Y axis plane), the mode waist is at point B which corresponds to an active layer 3 of the semiconductor laser, and lies at a point deeper inside the resonator from the mirror surface 2. For this reason, the focal points of the oscillated light rays in the junction plane (X-Y) plane and the vertical plane (X-Z) plane differ from each other to cause an astigmatism $\Delta Z$.

When a semiconductor laser of this type is used as a light source for a video disc player or the like, and light rays therefrom are focused by an objective lens or the like onto the reading surface of an optical disc, the spot is distorted into a horizontally or vertically elongated shape due to the astigmatism. When this occurs, a point for obtaining optimal reproduction data signals and tracking error signals cannot be determined. This reduces the margin for disturbance against servo such as defocusing or disc skew. In other words, desired OTF (Optical Transfer Function) characteristics of the optical system may not be obtained.

In view of this problem, the following methods have been conventionally used:

(a) According to the first method, those components of the light rays diverging from the semiconductor layer which are within a narrow central angle range are selected to be used for reading signals so as to eliminate disturbance in the wave front due to the astigmatism. The degree of adverse effect due to the astigmatism varies according to the NA (Numerical Aperture) of a collimator lens which is used to guide the light rays onto the objective lens. Therefore, if only those light components which are within a narrow central angle range are selected for reading signals, disturbance in the wave front is eliminated, although the efficiency of use of the light rays is degraded. Thus, desired OTF characteristics may be obtained in the case of a digital audio disc (DAD) which does not require too high an S/N ratio.

This will be explained in further detail. Since the S/N ratio required is not too high, a DAD player does not require too high an optical density. For this reason, a collimator lens having an NA of 0.13, for example, may be used. Then, even if a semiconductor laser having an astigmatism of 25 $\mu$m is used as a light source, the RMS value of the disturbance in the wave front is 0.056 ($\lambda$), which is within the diffraction limit, thus providing no problem.

However, when the first method described above is applied to a video disc player or the like which requires a relatively high S/N ratio, the laser output must be increased due to the low efficiency of light rays. Such an increase in the laser output gives rise to a problem of short service life of the semiconductor laser.

If a currently available semiconductor laser of this type is to be used as a light source for a video disc player or the like which requires a high S/N ratio without adopting the first method, then a collimator lens having an NA of 0.2 or more must be used in consideration of the angle of divergence of the light rays from the semiconductor laser. However, if such a collimator lens is used, the RMS value of the disturbance in the wave front due to an astigmatism of 25 $\mu$m becomes 0.13 ($\lambda$), which significantly degrades the OTF characteristics.

The RMS value of the disturbance in the wave front which is within the diffraction limit is known to be 0.07 ($\lambda$) (Marechal Criterion). The upper limit of astigmatism of a laser which satisfies such a criterion must be 13 $\mu$m if the NA of the collimator lens is assumed to be 0.2. The astigmatism of a currently available semiconductor laser of the gain guiding type is about 20 to 25 $\mu$m. For this reason, if a light source of a great light intensity is required, as in the case of a video disc player or the like, some measures for correcting the astigmatism must be taken.

(b) According to the second method, the astigmatism is corrected by an optical element such as a cylindrical lens which has different power (diffraction capacity) in different directions.

However, when the second method is adopted, since the power of the optical element is different in different directions, the optical element surface, that is, the lens surface, does not become a true sphere but an irregular sphere. Such an irregular sphere is difficult to design and manufacture. Furthermore, since the power of the optical element is different in different directions, various positioning adjustments of the optical element must be made including the angular position of the optical element with respect to the optical axis, the position of the element along the optical axis, and the directivity of the power in relation to the astigmatism. This complicates the positioning procedures of the optical element.

OBJECTS AND SUMMARY OF THE INVENTION

In accordance with the present invention an optical apparatus is provided which comprises: a semiconductor laser having first and second emitting points for first and second groups of light rays, respectively, the first group of light rays being emitted in a junction plane of the semiconductor laser and the second group of light rays being emitted in a plane perpendicular to the junction plane and in the direction of propagation of the first group of light rays; a cap element covering the semiconductor laser and having an aperture formed therein; focusing means to produce focused light of the first and second groups of light rays; and, at least one plane-parallel, light transmitting body of predetermined thickness arranged in the aperture of the cap element and before the focusing means and inclined at a predetermined angle relative to the direction of propagation so as to cause the astigmatism of the optical apparatus to be substantially zero and to minimize the coma of the optical apparatus.

BRIEF DESCRIPTION OF THE DRAWINGS

FIGS. 1(A) and 1(B) are schematic views for explaining the astigmatism of a semiconductor laser of the gain guiding type;

DETAILED DESCRIPTION OF THE PREFERRED EMBODIMENTS

Figure 2:
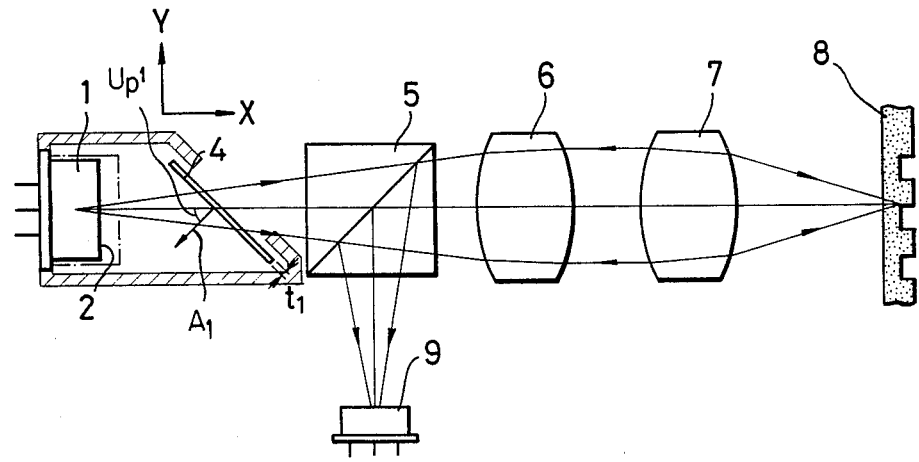
FIG. 2 is a sectional view along the optical axis and within the junction plane of a semiconductor laser of an optical apparatus of the first embodiment of the present invention.
Figure 3:
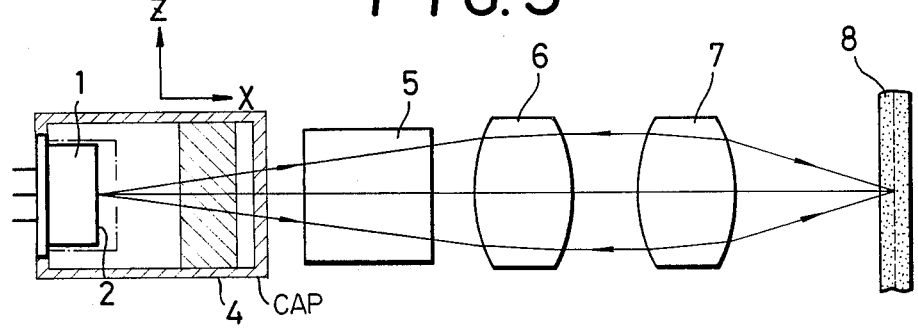
FIG. 3 is a sectional view along the optical axis and within the plane perpendicular to the junction plane of the semiconductor laser shown in FIG. 2.
Figure 4:
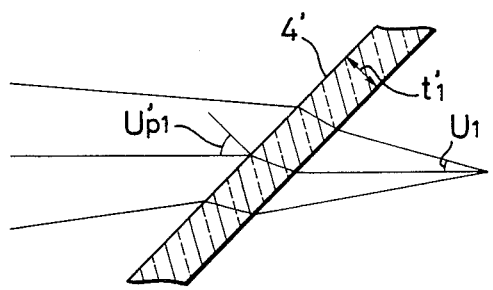
FIG. 4 is a schematic view for explaining correction of the astigmatism by a plane-parallel glass body.

An optical apparatus using a semiconductor laser as applied to an optical reader for an audio or video disc player according to the first embodiment of the present invention will now be described with reference to FIGS. 2 to 4. Note that the axes of coordinates in FIGS. 2 and 3 coincide with those shown in FIG. 1.

A semiconductor laser 1 as a light source is of the gain guiding type, which is one type of double heterojunction semiconductor laser. As has been described earlier, the focal point within the junction plane (X-Y axis plane) of the light rays radiated from the semiconductor laser 1 lies at a point slightly deeper inside the resonator from a mirror surface 2. However, the focal point in the vertical plane (X-Z axis plane) perpendicular to the junction plane of the light rays from the semiconductor laser 1 lies on the mirror surface 2, thus causing an astigmatism.

The diverging light rays from the semiconductor laser 1 become incident on a plane-parallel glass body 4 having a predetermined thickness $t_1$ and disposed in the optical path of these light rays. The plane-parallel glass body 4 may be either transparent or translucent, and is surrounded by air. The plane-parallel glass body 4 is arranged such that a normal vector $A_1$ thereof is inclined by a predetermined angle $U_{p1}$ within the junction plane (X-Y plane axis) with respect to the optical axis.

The light rays emerging from the plane-parallel glass body 4 then become incident on a beam splitter 5 which divides the incident light rays into transmitted light rays and reflected light rays. The transmitted light rays from the beam splitter 5 are converted into parallel light rays by a collimator lens 6 having a predetermined NA and disposed to guide light rays parallel to each other. These parallel light rays are focused by an objective lens 7 onto the reading surface of an optical disc 8 to form a small spot at the focal point of the lens 7.

Signals modulated by one or both of video and audio data are recorded on the reading surface of the optical disc 8 in the form of pit rows defining spiral or concentric tracks.

The light rays reflected from the reading surface of the optical disc 8 and modulated by the recorded signals or the pit rows then become incident on the objective lens 7 and are converted into parallel light rays. The reflected light rays, now converted into parallel light rays, propagate along the same optical path in the reverse order to become incident on the beam splitter 5 through the collimator lens 6. Those reflected light rays which are further reflected by the beam splitter 5 become incident on the light-receiving surface of a photosensor 9. The photosensor 9 produces reproduction data signals, tracking error signals and the like.

The mechanism for correction of the astigmatism by means of the plane-parallel glass body 4 will now be explained with reference to FIG. 4.

Assume that a plane-parallel glass body 4' (thickness $t_1'$, and refractive index $N_1$) is positioned on the optical path ($NA = \sin U_1$) of focused light rays to be inclined by an angle of $U_{p1}'$ with respect to the optical axis. Then, an astigmatism $A_{s1}$ arising in this optical system may be given by the following relation according to, for example, W. J. Smith, Modern Optical Engineering, McGraw-Hill, N.Y., 1966:

$$A_{s1} = l_s' - l_t' \qquad (1)$$

$$= (t_1'/\sqrt{N_1^2 - \sin^2 U_{p1}})$$

$$\{N_1^2 \cos^2 U_{p1}'/(N_1^2 - \sin^2 U_{p1}') - 1\}$$

$$= -[\{(N_1^2 - 1)\sin^2 U_{p1}'\}/(N_1^2 - \sin^2 U_{p1}')^{3/2}]t_1'$$

where $l_t'$ is the distance to the focal point in the plane (meridian plane) including the normal line and the optical axis, and $l_s'$ is the distance to the focal point in the plane perpendicular to the above plane.

Meanwhile, the coma$_s$ is given by:

$$\text{coma}_s = \{t_1' \cdot U_1^2 \cdot U_{p1}' \cdot (N_1^2 - 1)\}/2N_1^3 \qquad (2)$$

It is therefore possible to generate an astigmatism of the same magnitude but of the opposite algebraic sign to that of the astigmatism of the semiconductor laser 1 by selecting a predetermined thickness $t_1'$ and a predetermined angle $U_{p1}'$ for a predetermined NA, for example, $NA = \sin U_1 = 0.2$, in accordance with relations (1) and (2) above, and at the same time to suppress the coma to the minimum. For any $U_{p1}' \neq 0$, the astigmatism $A_s$ is given by:

$$A_s = l_s' - l_t' < 0$$

It can, therefore, be seen from the above that the astigmatism of the semiconductor laser 1 may be corrected if the meridian plane is made to coincide with the junction plane of the semiconductor laser 1.

If $t_1' = 0.1$ mm, $U_{p1}' = 45°$ and $N_1 = 1.5$, the astigmatism $A_{s1}$ may be calculated to be:

$$A_{s1} = l_s' - l_t' = -0.025 \text{ (mm)} = -25 \text{ (}\mu\text{m)}$$

As has been mentioned earlier, the astigmatism of the current semiconductor laser 1 of the gain guiding type is about 20 to 25 μm. Thus, an astigmatism of such a magnitude may be corrected by the astigmatism $A_{s1}$ above. In addition, the cam which may be produced in this case is only about 0.02 (λ) expressed by the RMS value of the wave front aberration and is thus negligible.

The astigmatism and the coma are both proportional to the thickness $t_1'$ of the plane-parallel glass body 4'. The astigmatism is of the order of a second power of the angle $U_{p1}'$, and the coma is proportional thereto. Therefore, the coma may be reduced to the minimum if the thickness $t_1'$ is smaller and the angle $U_{p1}'$ of the plane-parallel glass body 4' is greater for generating the astigmatism.

The astigmatism of the semiconductor laser 1 may be corrected by the plane-parallel glass body 4 which has the predetermined thickness $t_1$, and the normal vector $A_1$ of which is inclined by the predetermined angle $U_{p1}$ with respect to the optical axis within the junction plane (X-Y axis plane) of the semiconductor laser 1.

The small spot formed on the reading surface of the optical disc 8 by the objective lens 7 becomes substantially circular as a result of the correction of the astimatism by the plane-parallel glass body 4.

Accordingly, even if the NA of the collimator lens 6 is selected to be relatively great, the OTF characteristics may not allow interference between adjacent tracks. Even if an optical apparatus requires a high S/N ratio and a high light intensity, desired OTF characteristics may be obtained without requiring an increase in laser output. Since the optical element for correcting the astigmatism is the plane-parallel glass body 4, the surface of the element is easy to form. Since the optical element does not have power (refraction capacity), it only needs angular adjustment of the normal vector $A_1$ thereof with respect to the optical axis within the junction plane of the semiconductor laser 1. The optical element of the present invention only requires simple positioning.

In the first embodiment described above, the plane-parallel glass body 4 is disposed in the optical path of the diverging light rays. However, as may be seen from the mechanism for correcting the astigmatism described above, the plane-parallel glass body 4 may be disposed in the optical path of the focused light rays, for example, between the objective lens 7 and the reading surface of the optical disc 8. In the first embodiment, only one plane-parallel glass body 4 is used. However, the only requirement is that a predetermined thickness $t_1$ be provided, which allows correction of a given astigmatism. Therefore, two or more plane-parallel glass bodies 4 may be provided which have a total thickness $t_1$.

It is also possible to use a half mirror as the plane-parallel glass body 4. The half mirror may be obtained by forming a deposition film by coating on the surface of the glass body opposite to the semiconductor laser 1.

The normal vector of the half mirror or the glass body 4 is inclined by the angle $U_{p1} = 45°$ with respect to the optical axis. Then, the plane-parallel glass body 4 provides a function of correcting the astigmatism and also a function of beam splitting. In this case, the beam splitter 5 may be omitted. Furthermore, the plane-parallel glass body 4 may also serve as a cap window of the semiconductor laser 1.

In the first embodiment described above, correction of the astigmatism is performed by the plane-parallel glass body 4. However, the optical element for performing this function may be a plane-parallel sapphire body; the optical element need only transmit the light rays from the semiconductor laser 1.

Figure 5:
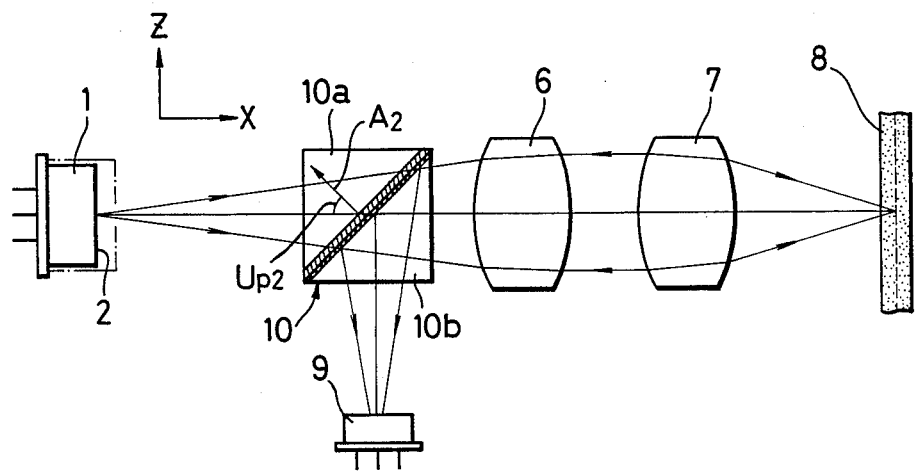
FIG. 5 is a sectional view along the optical axis and in the plane perpendicular to the junction plane of a semiconductor laser of an optical apparatus according to the second embodiment of the present invention.

The second embodiment of the present invention will now be described with reference to FIGS. 5 to 7. The same reference numerals in FIGS. 2 to 4 denote the same parts in FIGS. 5 to 7, and a detailed description thereof will be omitted. The axes of coordinates shown in FIG. 5 coincide with those shown in FIG. 1.

Diverging light rays from a semiconductor laser 1 of the gain guiding type as a light source become incident on a biprism 10 which is disposed in the optical path of these light rays.

Figure 6:
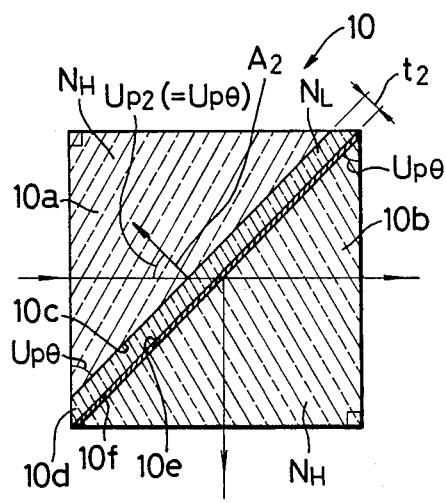
FIG. 6 is an enlarged sectional view of a biprism.

The biprism 10 comprises two triangular prisms 10a and 10b having the same refractive index $N_H$ and the same vertex angle $U_{p\theta}$, as shown in FIG. 6. A transparent film 10d, as the plane-parallel body of the present invention and having a refractive index $N_L$ smaller than the refractive index $N_H$ and a predetermined thickness $t_2$, is formed by deposition on an inclined surface 10c of the prism 10a. A translucent reflecting film 10f is formed by deposition on an inclined surface 10e of the prism 10b. Both these inclined surfaces 10c and 10e are adhered together by a known adhering means such that the transparent film 10d and the translucent reflecting film 10f are sandwiched therebetween, thereby completing the biprism 10. Therefore, the translucent reflecting film 10f is formed on one surface of the transparent film 10d. The biprism 10 provides the function of correcting the astigmatism by means of the transparent film 10d and also provides the function of beam splitting by means of the translucent reflecting film 10f.

The biprism 10 is so arranged that a normal vector $A_2$ of the transparent film 10d as the plane-parallel layer is inclined by a predetermined angle $U_{p2}$ ($=U_{p\theta}$) with respect to the optical axis within the plane (X-Z axis plane) which is perpendicular to the junction plane (X-Y axis plane) of the semiconductor layer 1 and which extends along the optical axis thereof.

The light rays transmitted through the biprism 10 are focused to form a small spot on the reading surface of an optical disc 8 through a collimator lens 6 and an objective lens 7.

The light rays reflected by the reading surface of the optical disc 8 and modulated by the signals recorded on the reading surface then propagate along the same optical path in the reverse order through the objective lens 7 and the collimator lens 6 to become incident on the biprism 10. Those reflected light rays which are reflected by the translucent reflecting film 10f of the biprism become incident on the light-recovering surface of a photosensor 9.

The mechanism of correction of the astigmatism by the transparent film 10d as the plane-parallel layer of the biprism 10 will now be described.

The astigmatism $A_{s2}$ of the diverging light rays transmitted through the film 10d of the biprism 10 is given by:

$$A_{s2} = -\{(N_r^2-1)\sin^2 U_{p2}/(N_r^2-\sin^2 U_{p2})^{3/2}\}\cdot(A_2/N_H) \quad (3)$$

for $N_r = N_L/N_H$ and $U_{p2} = U_{p\theta}$, where $N_r$ is a refractive index ratio which is obtained by dividing the refractive index $N_L$ of the transparent film 10d by the refractive index $N_H$ of the prisms 10a and 10b.

From consideration of relations (1) and (3), we can conclude the following:

(1) Both relations may be the same if $N_H = 1$ when $N_1 = N_r$, $U_{p1}' = U_{p2}$, and $t_1' = t_2$.

(2) If the refractive index ratio $N_r$ is greater than 1, the polarity of the astigmatism is the same as the alblebraic sign of relation (1). However, if $N_r$ is smaller than 1, the polarity of the astigmatism is inverted.

(3) If $N_r$ is smaller than 1, the denominator approximates to zero. Therefore, the astigmatism becomes greater than the absolute value of that when $N_r$ is greater than 1, assuming that the angle $U_{p2}$ and the thickness $d_2$ remain the same. A sensitivity coefficient S for the angle $U_{p2} = 45°$ is given by:

$$S = \frac{1}{2}\{(N_r^2-1)/(N_r^2-\frac{1}{2})\}$$

Figure 7:
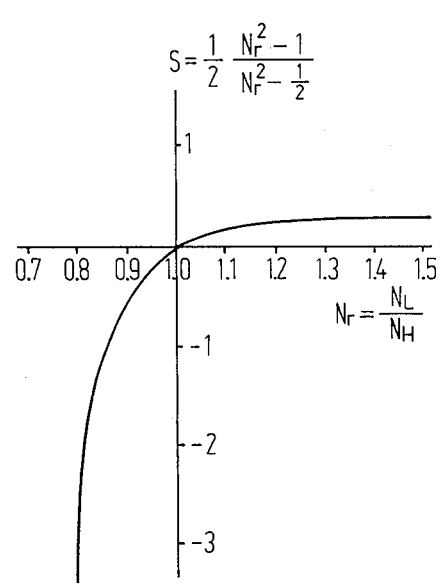
FIG. 7 is a graph showing the sensitivity coefficient S as a function of the refractive index $N_r$ of the biprism shown in FIG. 6.

FIG. 7 shows the sensitivity coefficient S as a function of the refractive index ratio $N_r$.

Accordingly, $N_r$ is preferably smaller than 1, since then the thickness of the transparent film 10d may then be made thinner and the deposition cost of the film 10d may be reduced to the minimum. However, in this case, s-polarized light must be obtained as shown in FIG. 5 in order to correct the astigmatism of the semiconductor laser. In other words, the normal vector $A_2$ of the transparent film 10d must be inclined with respect to the optical axis within the plane (X-Z axis plane) which is perpendicular to the junction plane (X-Y axis plane) of the semiconductor laser 1 and which extends along the optical axis, so that the junction plane (X-Y axis plane) of the semiconductor laser may be perpendicular to the plane of incidence defined by the optical axis and the normal vector $A_2$ of the transparent film 10d. If $N_r$ is greater than 1, p-polarized light must be obtained. In other words, the biprism 10 must be arranged such that the normal vector $A_2$ of the transparent film 10d is inclined with respect to the optical axis within the junction plane (X-Y axis plane) of the semiconductor laser 1.

If the prisms 10a and 10b comprise SF11 prisms having vertex angles (=inclined angles) $U_{p\theta} = 45°$ and a refractive index $N_H = 1.766$ ($\lambda = 780$ nm), and the transparent film 10d is formed by electron beam deposition of a deposition glass having a refractive index $N_L = 1.52$ to a thickness of $t_2 = 0.03$ mm (including the thickness of an adhesive having the same refractive index), the maximum astigmatism $A_{s2}$ which may be corrected may be calculated from relation (3) above to be 18.6 μm.

The small spot formed on the reading surface of the optical disc 8 by the objective lens 7 becomes substantially circular since the astigmatism has been corrected. Furthermore, since the translucent reflecting film 10f is deposited on the inclined surface 10e of the prism, the surface precision of the reflecting surface of the translucent reflecting film 10f remains high, thereby providing desired OTF characteristics.

Since the biprism 10 provides the function of correcting the astigmatism and also the function of beam splitting, desired OTF characteristics may be obtained without requiring an increase in the number of parts involved.

In the first embodiment described earlier, it is also possible to provide desired OTF characteristics without requiring an increase in the number of parts involved by coating a deposition film on one surface of the plane-parallel glass body 4 to provide the beam splitting function.

However, if $U_{p1} = 45°$ and $N_1 = 1.5$, the thickness $t_1$ required for generating a correcting astigmatism of 20 μm is calculated by relation (1) to be:

$$t_1 = 0.07 \text{ mm}$$

If a translucent reflecting film or a polarization reflecting film is deposited on such a thin plane-parallel glass body 4, the surface of the glass body 4 may be bent upon deposition of the film. This results in a large astigmatism and coma on the reflecting wave front, which impairs detection of the focus error signals and does not provide desired OTF characteristics. In other words, reproduction fidelity of the data signals may be impaired.

In the second embodiment, the transparent film 10d as the plane-parallel layer is deposited on the inclined surface 10c of one prism 10d. Therefore, unlike the case of the plane-parallel glass body 4 of the first embodiment, polishing and cleaning are not required, resulting in low manufacturing cost.

In the second embodiment, the biprism 10 is arranged in the optical path of the diverging light rays. However, as in the case of the first embodiment, the biprism 10 may be disposed in the optical path of the focused light rays, for example, between the objective lens 7 and the reading surface of the optical disc 8.

A polarization reflecting film may be deposited in place of the translucent reflecting film 10f. In this case, a ¼ wave plate or the like must be arranged in the optical path of the light rays.

In the first and second embodiments described above, the semiconductor laser 1 is a heterojunction semiconductor laser of the gain guiding type. However, the present invention may be similarly applied to any semiconductor laser which has different focal points in the junction plane and in a plane perpendicular thereto, to generate an astigmatism.

It is noted that the present invention may also be similarly applied to distance measuring devices, object movement measuring devices, data recording devices (master optical audio or video disc recording devices or the like), data transmission devices, and the like.

What is claimed is:

1. An optical apparatus comprising:
a semiconductor laser having first and second emitting points for first and second groups of light rays, respectively, said first group of light rays being emitted in a junction plane of said semiconductor laser, and said second group of light rays being emitted in a plane perpendicular to said junction plane and in the direction of propagation as said first light rays;
a cap element covering said semiconductor laser and having an aperture formed therein;
focusing means to produce focused light of said first and second group of light rays; and
at least one plane-parallel, light transmitting body of predetermined thickness arranged in the aperture of said cap element and before the focusing means and inclined at a predetermined angle relative to the direction of propagation so as to cause the astigmatism of said optical apparatus to be substantially zero and to minimize the coma of said optical apparatus.

* * * * *